United States Patent
Sofia et al.

(10) Patent No.: US 12,056,259 B2
(45) Date of Patent: Aug. 6, 2024

(54) SECURE INGRESS AND EGRESS FOR DATA ENGINES

(71) Applicant: International Business Machines Corporation, Armonk, NY (US)

(72) Inventors: Anthony Thomas Sofia, Hopewell-Junction, NY (US); Benjamin P. Segal, Hyde Park, NY (US); Jason G. Katonica, Glenmont, NY (US); Marcos Barbieri, Eastchester, NY (US)

(73) Assignee: International Business Machines Corporation, Armonk, NY (US)

( * ) Notice: Subject to any disclaimer, the term of this patent is extended or adjusted under 35 U.S.C. 154(b) by 381 days.

(21) Appl. No.: 16/995,922

(22) Filed: Aug. 18, 2020

(65) Prior Publication Data

US 2022/0058291 A1  Feb. 24, 2022

(51) Int. Cl.
| | |
|---|---|
| *G06F 21/64* | (2013.01) |
| *G06F 16/2453* | (2019.01) |
| *G06F 16/25* | (2019.01) |
| *G06F 16/27* | (2019.01) |
| *G06F 21/62* | (2013.01) |

(52) U.S. Cl.
CPC ........ *G06F 21/64* (2013.01); *G06F 16/24547* (2019.01); *G06F 16/258* (2019.01); *G06F 16/27* (2019.01); *G06F 21/6227* (2013.01)

(58) Field of Classification Search
CPC .. G06F 21/64; G06F 16/24547; G06F 16/258; G06F 16/27; G06F 21/6227; G06F 21/606; H04L 63/0428
See application file for complete search history.

(56) References Cited

U.S. PATENT DOCUMENTS

| 9,847,981 B1 | 12/2017 | Millikin |
| 10,255,454 B2 | 4/2019 | Kamara et al. |
| 2008/0033960 A1* | 2/2008 | Banks ............... G06F 16/242 |
| | | 707/999.009 |

(Continued)

FOREIGN PATENT DOCUMENTS

| CN | 101291493 A | * 10/2008 |
| CN | 105144189 A | 12/2015 |

(Continued)

OTHER PUBLICATIONS

International Search Report and Written Opinion for Internation Application No. PCT/CN2021/112974; International Filing Date: Aug. 17, 2021; date of Mailing: Nov. 17, 2021; 8 pages.

(Continued)

*Primary Examiner* — Fatoumata Traore
*Assistant Examiner* — Carlton Johnson
(74) *Attorney, Agent, or Firm* — CANTOR COLBURN LLP; Edward Wixted (57) ABSTRACT

Aspects include receiving a query at a data engine. The data engine includes data in a protected format stored in a secured database and a copy of the data in a clear format stored in a secured database replica. The query is received from a requestor. The query is processed at the secured database replica to generate a query response in the clear format. The query response is converted into the protected format. The converted query response in the protected format is provided to the requestor.

20 Claims, 6 Drawing Sheets

(56) References Cited

U.S. PATENT DOCUMENTS

| | | |
|---|---|---|
| 2014/0164758 A1* | 6/2014 | Ramamurthy .......... G06F 21/85 |
| | | 713/150 |
| 2014/0281512 A1 | 9/2014 | Arasu et al. |
| 2014/0281578 A1* | 9/2014 | Bennison .............. H04L 9/3236 |
| | | 713/189 |
| 2015/0169685 A1* | 6/2015 | Elias .................... H04L 47/125 |
| | | 707/718 |
| 2019/0050591 A1 | 2/2019 | Rane et al. |
| 2019/0087600 A1 | 3/2019 | Sion et al. |
| 2020/0036789 A1 | 1/2020 | Mehta et al. |

FOREIGN PATENT DOCUMENTS

| | | |
|---|---|---|
| CN | 107168998 A | 9/2017 |
| CN | 109995522 A | 7/2019 |
| CN | 116194921 A | 5/2023 |
| WO | 2022037566 A1 | 2/2022 |

OTHER PUBLICATIONS

Arasu et al., "A secure coprocessor for database applications", Microsoft Research, Jun. 21, 2013, 9 pages, https://www.microsoft.com/en-us/research/wp-content/uploads/2016/02/FPL_203_CameraReady.pdf.

Beier et al., "Architecture of a data analytics service in hybrid cloud environments", Information Technology, May 29, 2017, 8 pages, https://www.researchgate.net/figure/Traditional-Load-Architecture_fig4_315697761.

* cited by examiner

SECURE INGRESS AND EGRESS FOR DATA ENGINES

BACKGROUND

The present invention generally relates to computer processing, and more specifically, to secure ingress and egress for data engines.

Enterprise environments often encompass a combination of public cloud, private cloud, and on premise/privately managed information technology (IT) environments. Data can be moved between these environments using extraction, transformation, and loading (ETL) techniques when the data is moved into a destination environment which represents the data differently than the source environment(s). When ETL techniques are applied, the data is transformed before being loaded into the source environment. Data can also be moved between environments using extraction, loading, and transformation (ELT) techniques where the raw data from the source environment is loaded into the target environment and transformed at the target environment. In general, each of the different IT environment may supply highly secured micro-pipelines within their respective environment, but the crossing of data across site boundaries needs to be carefully managed, inspected, and analyzed to validate the authenticity and trustworthiness of data.

SUMMARY

Embodiments of the present invention are directed to secure ingress and egress for data engines. A non-limiting example computer-implemented method includes receiving a query at a data engine. The data engine includes data in a protected format stored in a secured database and a copy of the data in a clear format stored in a secured database replica. The query is received from a requestor. The query is processed at the secured database replica to generate a query response in the clear format. The query response is converted into the protected format. The converted query response in the protected format is provided to the requestor.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagrams, or the operations described therein without departing from the spirit of the invention. For instance, the actions can be performed in a differing order or actions can be added, deleted or modified. Also, the term "coupled" and variations thereof describe having a communications path between two elements and do not imply a direct connection between the elements with no intervening elements/connections between them. All of these variations are considered a part of the specification.

DETAILED DESCRIPTION

One or more embodiments of the present invention provide secure ingress and egress for data engines. Protected views of data are often required in data engines in order to provide security and privacy for the data. Data queries are typically optimized based on data values that are stored in a clear (or non-protected) format. Executing the optimized queries against data that is stored in a protected format can result in the queries not being able to take advantage of the optimizations. One or more embodiments of the present invention provide an efficient mechanism for accelerating queries on views of protected data with protection around specific data engines.

As used herein, the term "data engine" refers to a data infrastructure that can include data stored in a protected format, a replica of the data stored in a clear format, and a data security system for providing security for the data and for converting data back and forth between the clear format and the protected format. In accordance with one or more embodiments of the present invention, the data engine is implemented by a database management system (DBMS) such as, but not limited to IBM® Db2®. Embodiments of the data engine are not limited to database infrastructures and may also include, for example, file infrastructures such as those use by Linux®. In accordance with one or more embodiments of the present invention, the data may be stored in any manner known in the art such as, but not limited to a database format (e.g., Db2) and a file format (e.g., a Linux® data source).

One or more embodiments of the present invention can be utilized to integrate secured gateways into and out of a data engine that includes a database accelerator infrastructure such as, but not limited to IBM Db2 Analytics Accelerator (IDAA). When IDAA is used to provide a replica of the data organized for optimizing particular types of queries, one or more embodiments of the present invention prevent selectable column/field level tablespace data from being exposed in the clear outside of IDAA and the owning application, including within Db2. The replica can also be other systems, such as a secured database system designed for read-only queries (e.g., IBM HyperProtect DBaaS).

In accordance with one or more embodiments of the present invention, direct connections to Db2 (or any other database or file system) never expose sensitive data in the clear, and structured query language (SQL) queries or statements that have permission to access sensitive data can still be processed efficiently according to their SQL semantics through the gateways within the secure IDAA appliance. Data is in the clear only within the secured appliance and delivered back directly to the requesting application. In accordance with one or more embodiments of the present invention, when IDAA is used, the data key exchange between the gateway in the client application and the gateway on the input and output of the secure IDAA can be handled in existing ways, such as, but not limited to indexed queries, searching and sorting.

One or more embodiments of the present invention are contrasted with contemporary approaches where data in the secured database replica is in a clear format, and accessible by queries and applications outside of the data engine, and therefore the data may be at risk for a security breach. In other models, the data remains encrypted in the database engine, not allowing functional usages of the query.

One or more embodiments of the present invention address one or more of the shortcomings of contemporary approaches by allowing for queries on protected data in a DBMS for fields that are not subject to protection. In addition, one or more embodiments of the present invention allow for optimized queries in a secure appliance for all fields in a table whether they are protected or not. This could also happen at a file level rather than a DBMS when data files such as Linux data sources are utilized. As used herein the term "optimized query" refers to a query that has been tuned to run as quickly as possible, for example by setting up and utilizing particular indices into the data, by organizing the data in a particular manner, and/or by arranging the query statement in a particular manner. An optimized query can also be tuned to conserve resource usage or to provide an agreed upon quality of service (QOS) level.

Figure 1:
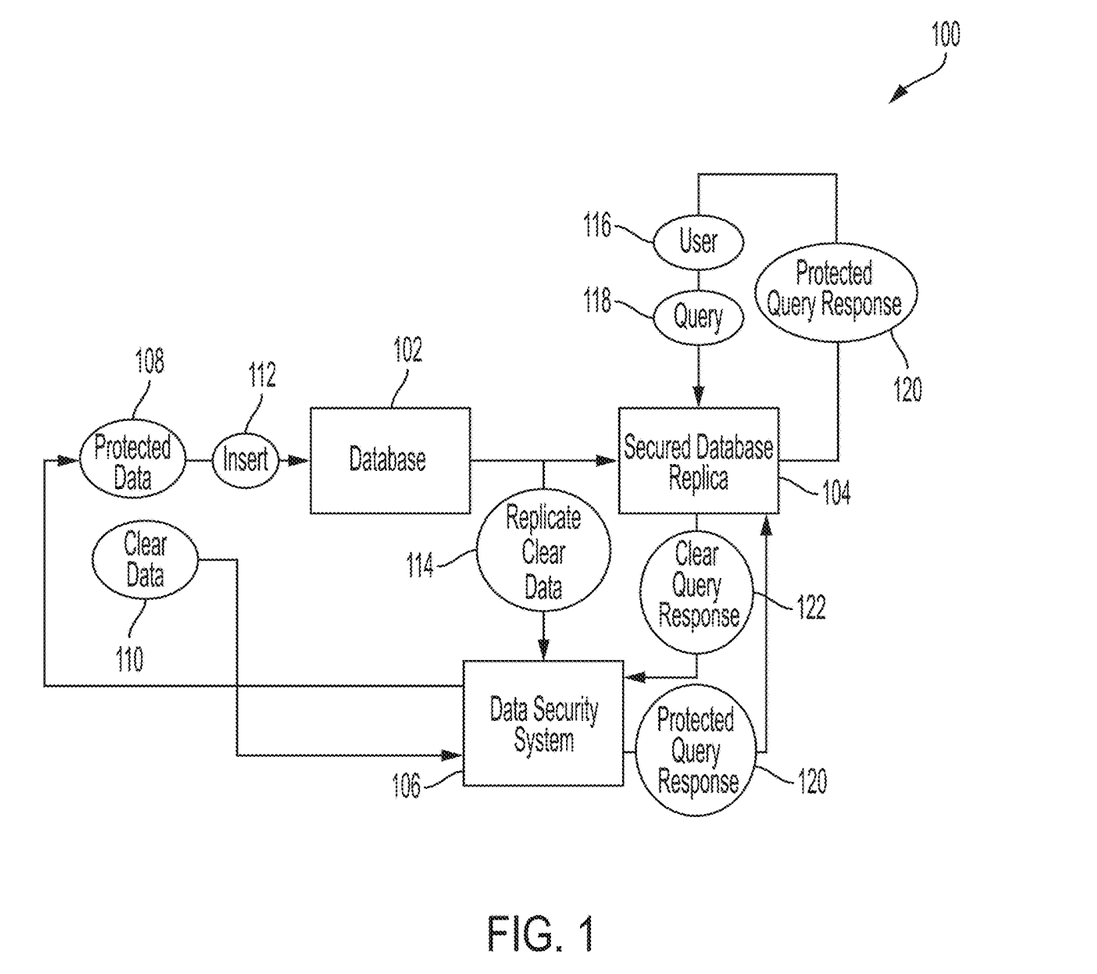
FIG. 1 depicts a block diagram of a system for secure ingress and egress for data engines according to one or more embodiments of the present invention.

Turning now to FIG. 1, a block diagram 100 of a system for secure ingress and egress for data engines is generally shown in accordance with one or more embodiments of the present invention. The components shown in FIG. 1 include a secured database 102, a secured database replica 104, and a data security system 106. The processing described in reference to FIG. 1 may be performed by computer instructions executing on a processor 605 located on computer 601 of FIG. 6 and/or on a processor located on a cloud computing node 10 of FIG. 4.

In one or more embodiments of the present invention, the database 102, secured database replica 104, and data security system 106 together perform data engine functions and are referred to collectively as a data engine. Other data engines in one or more other embodiments may be configured differently than the data engine shown in FIG. 1. For example, all or a subset of the functions performed by the data security system 106 shown in FIG. 1 may be performed by the database 102. In addition, other components, may be included in one or more embodiments of the data engine.

In accordance with one or more embodiments of the present invention, the database 102 includes computer instructions to perform database management functions (e.g., control access to data, process queries, organize data) as well as data (e.g., database table(s), file). As shown in FIG. 1, the secured database 102 includes data in a protected format and the secured database replica 104 includes a copy of the data in the secured database after it has been converted into a non-protected, or clear format. The secured database replica 104 may include its own database management functions or it may be controlled by the database management system used by the database 102. The data security system 106 can be a standalone module as shown in FIG. 1 or it can be integrated into the database management functions.

As shown in FIG. 1 data input from a client application is protected when the data is resident inside of the data engine. Clear data 110 is received, for example, from a client application and input to data security system 106. In other embodiments the clear data 110 is received from a process such as, but not limited to, an extraction, transformation, and loading (ETL) process or an extraction, loading, and transformation (ELT) process. The data security system 106 secures the clear data 110 by converting it into protected data 108 for insertion into the database 102 via, for example, a DBMS insert command 112, The data security system 106 may perform the converting from clear data 110 into protected data in any manner known in the art such as, but not limited to Advanced Encryption Standard (AES) encryption, Db2 native encryption, and Transparent Data Encryption (TDE). In accordance with one or more embodiments of the present invention, the data in database 102 is stored in a protected format that requires access to a key or other mechanism to convert it into a clear, or non-encrypted, format. The data security system 106 may apply different security algorithms and/or keys to different users and/or to different data fields. This provides the ability to have different data access and security rules for different users.

Also as shown in FIG. 1, protected data is replicated from database 102 to secured database replica 104, where the consuming end of the secured database replica 104 uses the same field protocol as the application providing the clear data 110 and has the ability to securely transmit required key parts. In accordance with one or more embodiments of the present invention, the data security system can be broken into different parts and then the key material can be moved between them, allowing for example, a key created in one instance to be moved to another instance. In this manner, objects created in one instance can be moved to another instance. As shown in FIG. 1, the protected data in database 102 is converted into replicated clear data 114 by the data security system 106 before being stored in secured database replica 104. Thus, on the replication path from the database 102 to the secured database replica 104, the data goes back to the data security system 106 and will be opened and returned in the clear, as replicated clear data 114. This allows the data, in a clear format, to be copied into secured database replica 104.

In accordance with one or more embodiments of the present invention, secured database replica 104 is a secure appliance. As used herein, the term "secure appliance" refers to an acceleration device, such as IBM Db2 IDAA or a secure database service, such as IBM HyperProtect DBaaS.

In accordance with one or more embodiments of the present invention, queries 118 against the secured database replica 104 use clear data, however before data is returned to the user 116 the data is processed by the data security system 106 to generate a protected query response 120. In this manner, all outputs from the secured database replica 104 go through the same processing as the client application to provide protected data using the same negotiated key parts as the other steps. Thus, when the client application creates the protected data to be inserted, for example, it can use AES256 encryption and may package the data up using a specific format. In accordance with one or more embodiments of the present invention, the data coming back from a protected query response 120 will have the same format of the data that would be created by the client. This provides compatibility between what the client application inserts and the data that is returned.

As shown in the embodiment of FIG. 1, a user 116 submits a query 118 to secured database replica 104. The user 116 can be an individual user submitting a query via a user interface or the user 116 can be a computer program submitting the query in a batch or online manner. Secured database replica 104 processes the query and generates a clear query response 122 which is sent to the data security system 106 to generate a secure, or protected query response 120. The protected query response 120 is sent back to the secured database replica 104. The protected query response 120 in the protected format is output to the user 116. The user 116 can convert the protected query response 120 into a clear format if the user 116 has authority. For example, the user 116 may have authority if the user has a copy of a key used by the data security system 106 to generate the protected query response 120.

The embodiments described herein with respect to block diagram 100 of FIG. 1 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
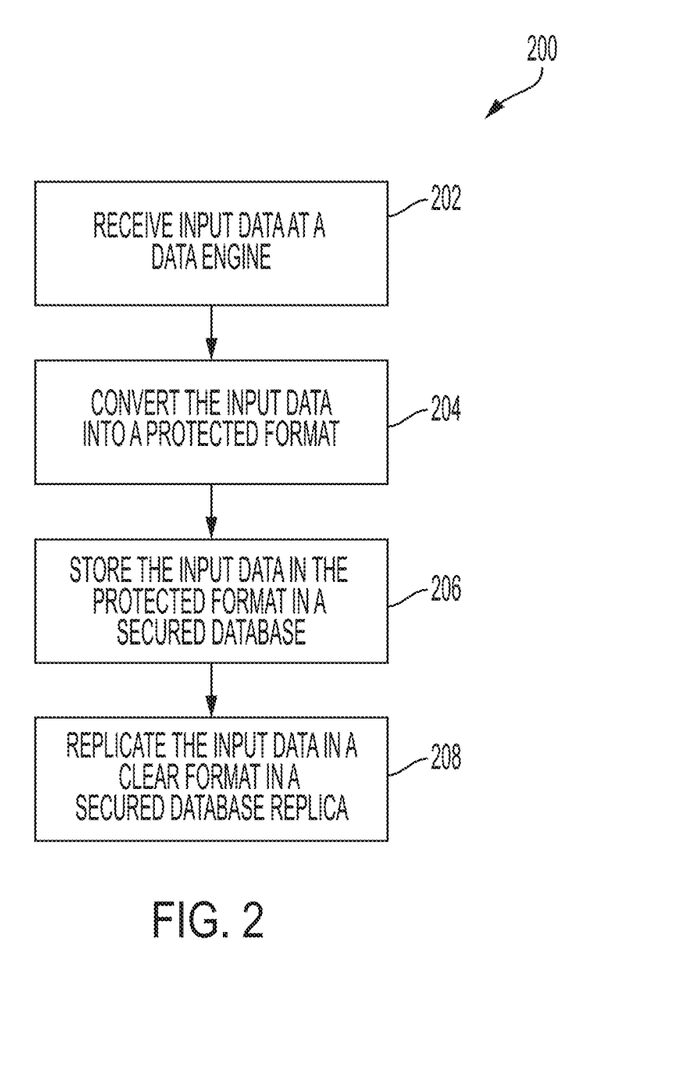
FIG. 2 depicts a flow diagram of a method for providing secure ingress at a data engine according to one or more embodiments of the present invention.

Turning now to FIG. 2, a flow diagram of a method 200 for providing secure ingress at a data engine is generally shown in accordance with one or more embodiments of the present invention. All or a portion of the processing shown in FIG. 2 can be performed, for example, by database 102 and/or secured database replica 104 and/or data security system 106 executing on a processor 605 located on computer 601 of FIG. 6 and/or on a processor located on a cloud computing node 10 of FIG. 4.

At block 202, input data, such as clear data 110 of FIG. 1, for insertion into a secured database or data file, such as database 102 of FIG. 1, is received at a data engine. The input data can be received from any data source known in the art such as, but not limited to, a client (or user) application, an ETL process, or an ELT process. At block 204, the input data is converted by a data security module, such as data security system 106 of FIG. 1, into a protected format to generate protected data, such as protected data 108 of FIG. 1. As described previously, any type of data security scheme known in the art can be utilized to perform the conversion of the data from a clear (e.g., unencrypted) format into protected (e.g., encrypted) format.

At block 206 of the embodiment shown in FIG. 2, the data in the protected format is stored in a secured database or data file, such as database 102 of FIG. 1. At block 208, the protected data is replicated in a clear format in a secured database replica, such as secured database replica 104 of FIG. 1. In accordance with one or more embodiments of the present invention, the protected data is replicated by a data security module that converts the protected data into a clear format which is then copied into or stored in the secured database replica. Using the same data security module for both storing the protected data in the secured database and storing the clear data in a replica of the secured database allows one or more embodiments of the present invention to support different security schemes for different applications or users.

In accordance with one or more embodiments of the present invention, only a subset of the data fields in the data being inserted into the secured database or data file are converted into protected data. For example, if the secured database is implemented by a relational database, only a subset of the columns may be converted into the protected format, leaving data in some of the columns in the clear format in the secured database.

The process flow diagram of FIG. 2 is not intended to indicate that the operations of the method 200 are to be executed in any particular order, or that all of the operations of the method 200 are to be included in every case. Additionally, the method 200 can include any suitable number of additional operations Turning now to FIG. 3, a flow diagram of a method 300 for providing secure egress at a data engine is generally shown in accordance with one or more embodiments of the present invention. All or a portion of the processing shown in FIG. 3 can be performed, for example, by secured database replica 104 and/or data security system 106 executing on a processor 605 located on computer 601 of FIG. 6 and/or on a processor located on a cloud computing node 10 of FIG. 4.

Figure 3:
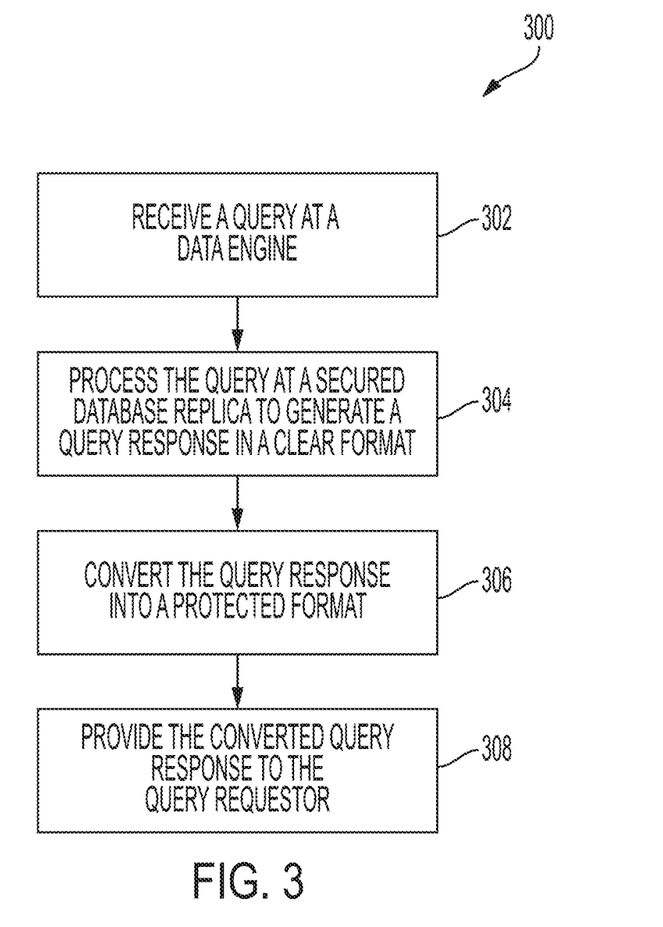
FIG. 3 depicts a flow diagram of a method for providing secure egress at a data engine according to one or more embodiments of the present invention.

At block 302 a query, such as query 118 of FIG. 1, is received at a secured database replica of a data engine, such as secured database replica 104 of FIG. 1. In accordance with one or more embodiments of the present invention, the query is received in a clear format from a user, such as user 116 of FIG. 1. In accordance with one or more embodiments of the present invention, the secured database replica may be configured to optimize particular types of queries including the query received at block 302. The query is executed, or processed, in the clear format at block 304 to generate a query response in the clear format, such as clear query response 122 of FIG. 1.

At block 306, the query response in the clear format is converted into a protected format by a data security module, such as data security system 106 of FIG. 1. In accordance with one or more embodiments of the present invention, the conversion of query results, or response, into the protected format is performed by applying the same process and/or security key(s) that are used to convert clear data prior to insertion into the secured database. The converted query response with the data in a protected format is returned to the query requestor at block 308.

In accordance with one or more embodiments of the present invention, the processing of the received query further includes determining whether the received query should be executed against the secure data base having data in a protected format, such as database 102 of FIG. 1, or against the secured database replica having data in a clear format, such as secured database replica 104 of FIG. 1, This determination can be based, for example, on whether the received query is a type of query that the secured database replica has been tuned to optimize. The determination can alternatively or additionally be based on environmental factors such as an amount of current usage of the two databases, QOS targets, and/or on reliability, availability and serviceability (RAS) requirements associated with the query. If it is determined that the query should be run against the secured database replica, the processing in blocks 304 and 306 are performed. Alternatively, if it is determined that the query should be run against the secured database, the query is converted into the protected format and executed against the secured database.

The process flow diagram of FIG. 3 is not intended to indicate that the operations of the method 300 are to be executed in any particular order, or that all of the operations of the method 300 are to be included in every case. Additionally, the method 300 can include any suitable number of additional operations It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
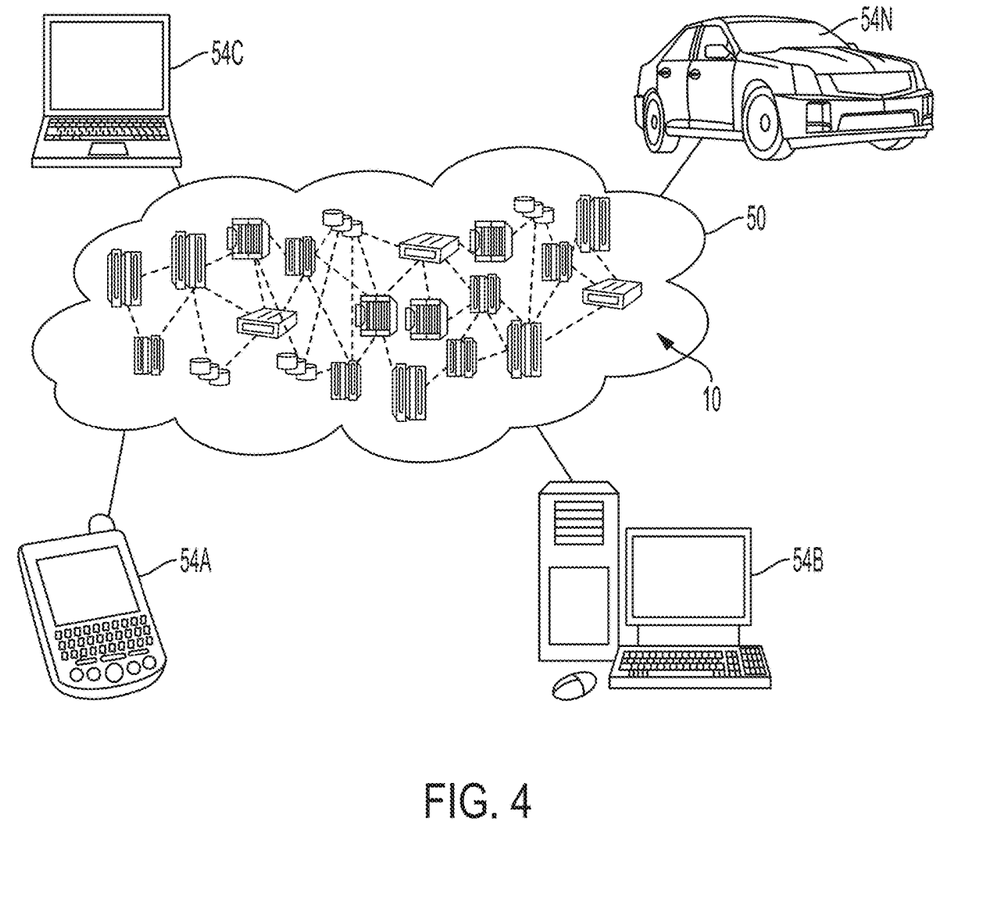
FIG. 4 depicts a cloud computing environment according to one or more embodiments of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
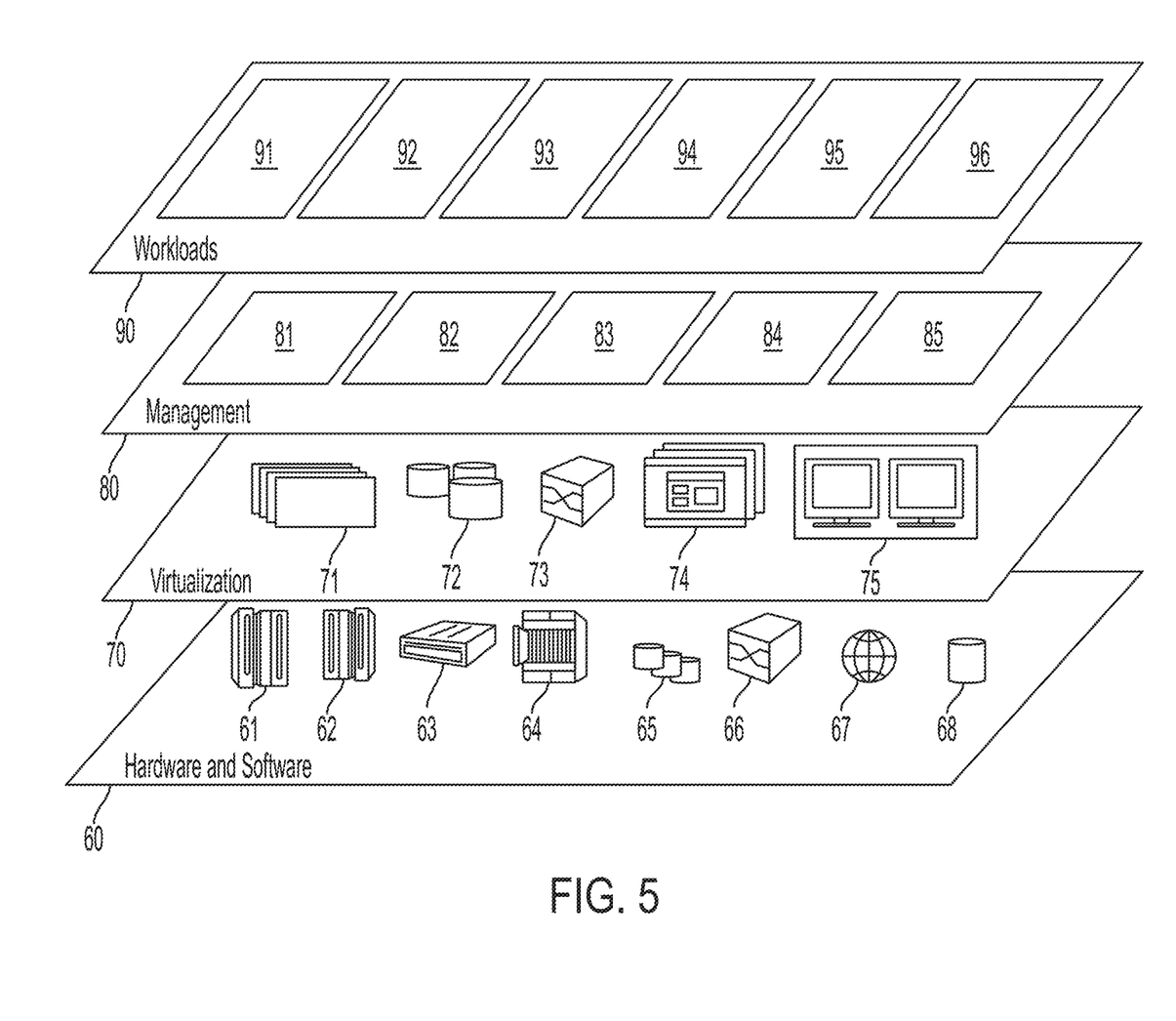
FIG. 5 depicts abstraction model layers according to one or more embodiments of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data encryption/decryption 96.

It is understood that one or more embodiments of the present invention are capable of being implemented in conjunction with any type of computing environment now known or later developed.

Figure 6:
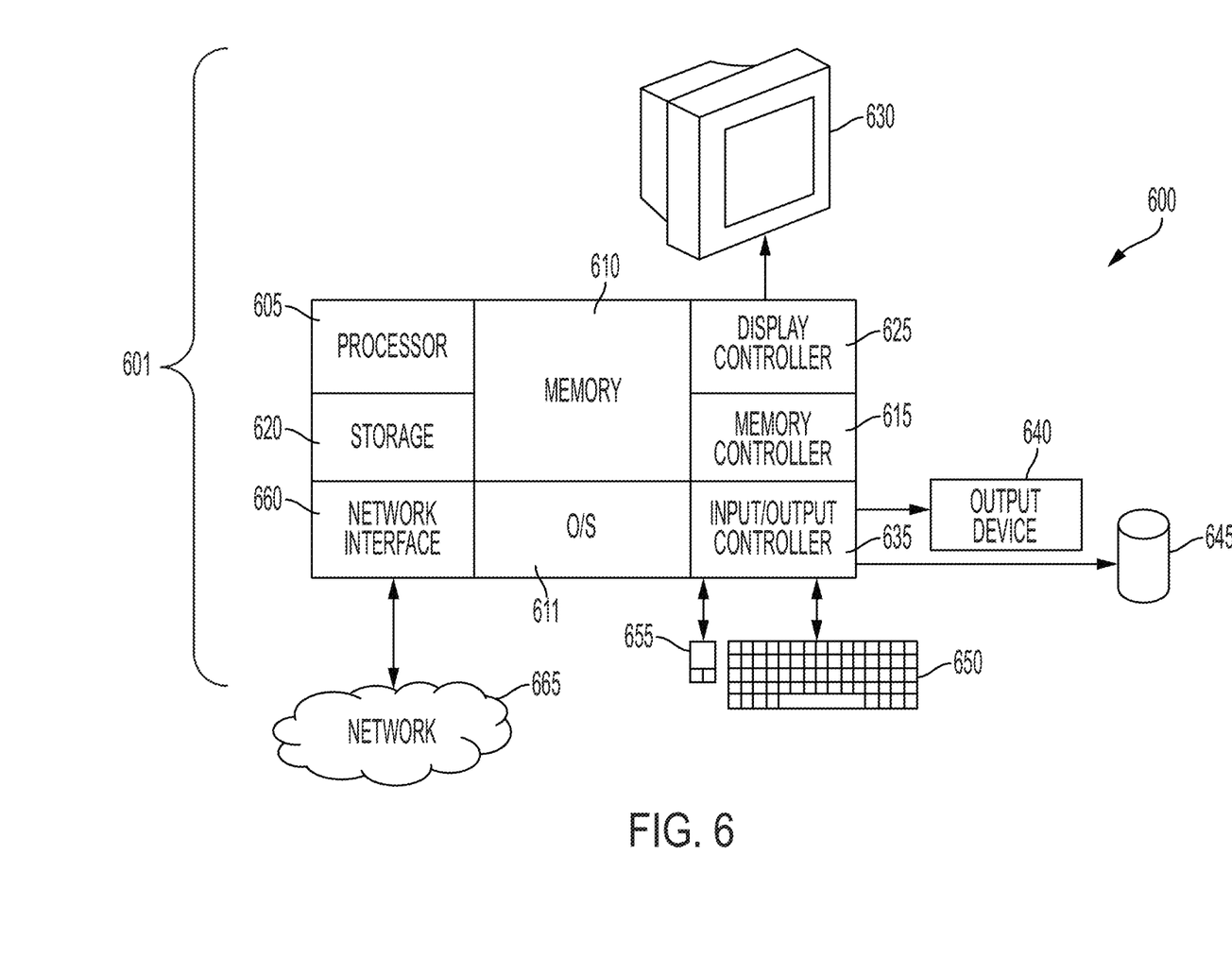
FIG. 6 illustrates a system for secure ingress and egress for data engines according to one or more embodiments of the present invention.

Turning now to FIG. 6, a computer system for secure ingress and egress for data engines is generally shown in accordance with one or more embodiments of the present invention. The methods described herein can be implemented in hardware, software (e.g., firmware), or a combination thereof. In one or more exemplary embodiments of the present invention, the methods described herein are implemented in hardware as part of the microprocessor of a special or general-purpose digital computer, such as a personal computer, workstation, minicomputer, or mainframe computer. The system 600 therefore may include general-purpose computer or mainframe 601 capable of running multiple instances of an O/S simultaneously.

In one or more exemplary embodiments of the present invention, in terms of hardware architecture, as shown in FIG. 6, the computer 601 includes one or more processors 605, memory 610 coupled to a memory controller 615, and one or more input and/or output (I/O) devices 640, 645 (or peripherals) that are communicatively coupled via a local input/output controller 635. The input/output controller 635 can be, for example but not limited to, one or more buses or other wired or wireless connections, as is known in the art. The input/output controller 635 may have additional elements, which are omitted for simplicity, such as controllers, buffers (caches), drivers, repeaters, and receivers, to enable communications. Further, the local interface may include address, control, and/or data connections to enable appropriate communications among the aforementioned components. The input/output controller 635 may include a plurality of sub-channels configured to access the output devices 640 and 645. The sub-channels may include fiber-optic communications ports.

The processor 605 is a hardware device for executing software, particularly that stored in storage 620, such as cache storage, or memory 610. The processor 605 can be any custom made or commercially available processor, a central processing unit (CPU), an auxiliary processor among several processors associated with the computer 601, a semiconductor based microprocessor (in the form of a microchip or chip set), a macroprocessor, or generally any device for executing instructions.

The memory 610 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 610 may incorporate electronic, magnetic, optical, and/or other types of storage media. Note that the memory 610 can have a distributed architecture, where various components are situated remote from one another, but can be accessed by the processor 605.

The instructions in memory 610 may include one or more separate programs, each of which comprises an ordered listing of executable instructions for implementing logical functions. In the example of FIG. 6, the instructions in the memory 610 a suitable operating system (OS) 611. The operating system 611 essentially controls the execution of other computer programs and provides scheduling, input-output control, file and data management, memory management, and communication control and related services.

In accordance with one or more embodiments of the present invention, the memory 610 may include multiple logical partitions (LPARs) each running an instance of an operating system. The LPARs may be managed by a hypervisor, which may be a program stored in memory 610 and executed by the processor 605.

In one or more exemplary embodiments of the present invention, a conventional keyboard 650 and mouse 655 can be coupled to the input/output controller 635. Other output devices such as the I/O devices 640, 645 may include input devices, for example but not limited to a printer, a scanner, microphone, and the like. Finally, the I/O devices 640, 645 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 600 can further include a display controller 625 coupled to a display 630.

In one or more exemplary embodiments of the present invention, the system 600 can further include a network interface 660 for coupling to a network 665. The network 665 can be an IP-based network for communication between the computer 601 and any external server, client and the like via a broadband connection. The network 665 transmits and receives data between the computer 601 and external systems. In an exemplary embodiment, network 665 can be a managed IP network administered by a service provider. The network 665 may be implemented in a wireless fashion, e.g., using wireless protocols and technologies, such as WiFi, WiMax, etc. The network 665 can also be a packet-switched network such as a local area network, wide area network, metropolitan area network, Internet network, or other similar type of network environment. The network 665 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 601 is a PC, workstation, intelligent device or the like, the instructions in the memory 610 may further include a basic input output system (BIOS) (omitted for simplicity). The BIOS is a set of essential software routines that initialize and test hardware at startup, start the OS 611, and support the transfer of data among the hardware devices. The BIOS is stored in ROM so that the BIOS can be executed when the computer 601 is activated.

When the computer 601 is in operation, the processor 605 is configured to execute instructions stored within the memory 610, to communicate data to and from the memory 610, and to generally control operations of the computer 601 pursuant to the instructions. In accordance with one or more embodiments of the present invention, computer 601 is an example of a cloud computing node 10 of FIG. 4.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discreet logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method comprising:
receiving a query at a data engine, the data engine comprising data in an encrypted format stored in a secured database and a copy of the data in an unencrypted format stored in a secured database replica, wherein the secured database is tuned to optimize processing of at least a first type of query, wherein the secured database replica is tuned to optimize processing of at least a second type of query, and wherein a database is tuned to optimize processing of a query type when the database is configured to run queries of the query type as quickly as possible, the receiving from a requestor;
determining, based on a type of the query and based on at least one of quality of service (QOS) targets, and on reliability, availability and serviceability (RAS) requirements associated with the query, that the query should be processed by the secured database replica;
based on determining that the query should be processed by the secured database replica:
processing the query at the secured database replica to generate a query response in the unencrypted format;
converting the query response into the encrypted format; and
providing the converted query response in the encrypted format to the requestor.

2. The method of claim 1, wherein the query is characterized as being the second type of query.

3. The method of claim 1, further comprising:
receiving input data at the data engine, the input data in the encrypted format; and
storing the input data in the encrypted format in the secured database.

4. The method of claim 3, further comprising replicating the input data, the replicating comprising:
converting the input data stored in the secured database into the unencrypted format; and
storing the input data in the unencrypted format in the secured database replica.

5. The method of claim 3, wherein the input data in unencrypted format is received from a client application.

6. The method of claim 3, wherein the data engine further comprises a data security system that applies a security scheme to perform:
the converting the query response into the encrypted format;
converting the input data into the encrypted format; and
converting the input data stored in the secured database into the unencrypted format.

7. The method of claim 1, wherein the secured database and the secured database replica are relational databases.

8. The method of claim 7, wherein contents of only a subset of columns in a row of the secured database are in the encrypted format.

9. The method of claim 1, wherein the determining, based on a type of the query and based on at least one of the quality of service (QOS) targets, and on reliability, availability and serviceability (RAS) requirements associated with the query, that the query should be processed by the secured database replica is further based on an amount of current usage of the two databases.

10. The method of claim 9, wherein the determining, based on the type of query and based on at least one of the quality of service (QOS) targets, and on reliability, availability and serviceability (RAS) requirements associated with the query is based on the type of query and based on each of the quality of service (QOS) targets, and on reliability, availability and serviceability (RAS) requirements associated with the query.

11. A system comprising:
one or more processors for executing computer-readable instructions, the computer-readable instructions controlling the one or more processors to perform operations stored in a memory, the operations comprising:
receiving a query at a data engine, the data engine comprising data in a encrypted format stored in a secured database and a copy of the data in an unencrypted format stored in a secured database replica, wherein the secured database is tuned to optimize processing of at least a first type of query, wherein the secured database replica is tuned to optimize processing of at least a second type of query, and wherein a database is tuned to optimize processing of a query type when the database is configured to run queries of the query type as quickly as possible, the receiving from a requestor;
determining, based on a type of the query and based on at least one of quality of service (QOS) targets, and on reliability, availability and serviceability (RAS) requirements associated with the query, whether the query should be processed by the secured database replica or the secured database;
based on determining that the query should be processed by the secured database replica:
processing the query at the secured database replica to generate a query response in the unencrypted format;
converting the query response into the encrypted format; and
providing the converted query response in the encrypted format to the requestor.

12. The system of claim 11, wherein the query is characterized as being a first type of query, and the secured database replica is tuned to optimize performance of one or more types of queries including the first type of query.

13. The system of claim 11, wherein the operations further comprise:
receiving input data at the data engine, the input data in the unencrypted format;
converting the input data into the encrypted format; and
storing the input data in the encrypted format in the secured database.

14. The system of claim 13, wherein the operations further comprise replicating the input data, the replicating comprising:
converting the input data stored in the secured database into the unencrypted format; and
storing the input data in the unencrypted format in the secured database replica.

15. The system of claim 13, wherein the input data in unencrypted format is received from a client application.

16. The system of claim 13, wherein the data engine further comprises a data security system that applies a security scheme to perform:

the converting the query response into the encrypted format;
converting the input data into the encrypted format; and
converting the input data stored in the secured database into the unencrypted format.

17. The system of claim 11, wherein the secured database and the secured database replica are relational databases.

18. The system of claim 17, wherein contents of only a subset of columns in a row of the secured database are in the encrypted format.

19. A computer program product comprising a computer-readable storage medium having program instructions embodied therewith, the program instructions executable by a processor to cause the processor to perform operations comprising:

receiving a query at a data engine, the data engine comprising data in an encrypted format stored in a secured database and a copy of the data in an unencrypted format stored in a secured database replica, wherein the secured database is tuned to optimize processing of at least a first type of query, wherein the secured database replica is tuned to optimize processing of at least a second type of query, and wherein a database is tuned to optimize processing of a query type when the database is configured to run queries of the query type as quickly as possible, the receiving from a requestor;

determining, based on a type of the query and based on quality of service (QOS) targets, and on reliability, availability and serviceability (RAS) requirements associated with the query, whether the query should be processed by the secured database replica or the secured database;

based on determining that the query should be processed by the secured database replica:
  processing the query at the secured database replica to generate a query response in the unencrypted format;
  converting the query response into the encrypted format; and
  providing the converted query response in the encrypted format to the requestor.

20. The computer program product of claim 19, wherein the operations further comprise:
  receiving input data at the data engine, the input data in the unencrypted format;
  converting the input data into the encrypted format; and
  storing the input data in the encrypted format in the secured database.

* * * * *